United States Patent Office 3,004,078
Patented Oct. 10, 1961

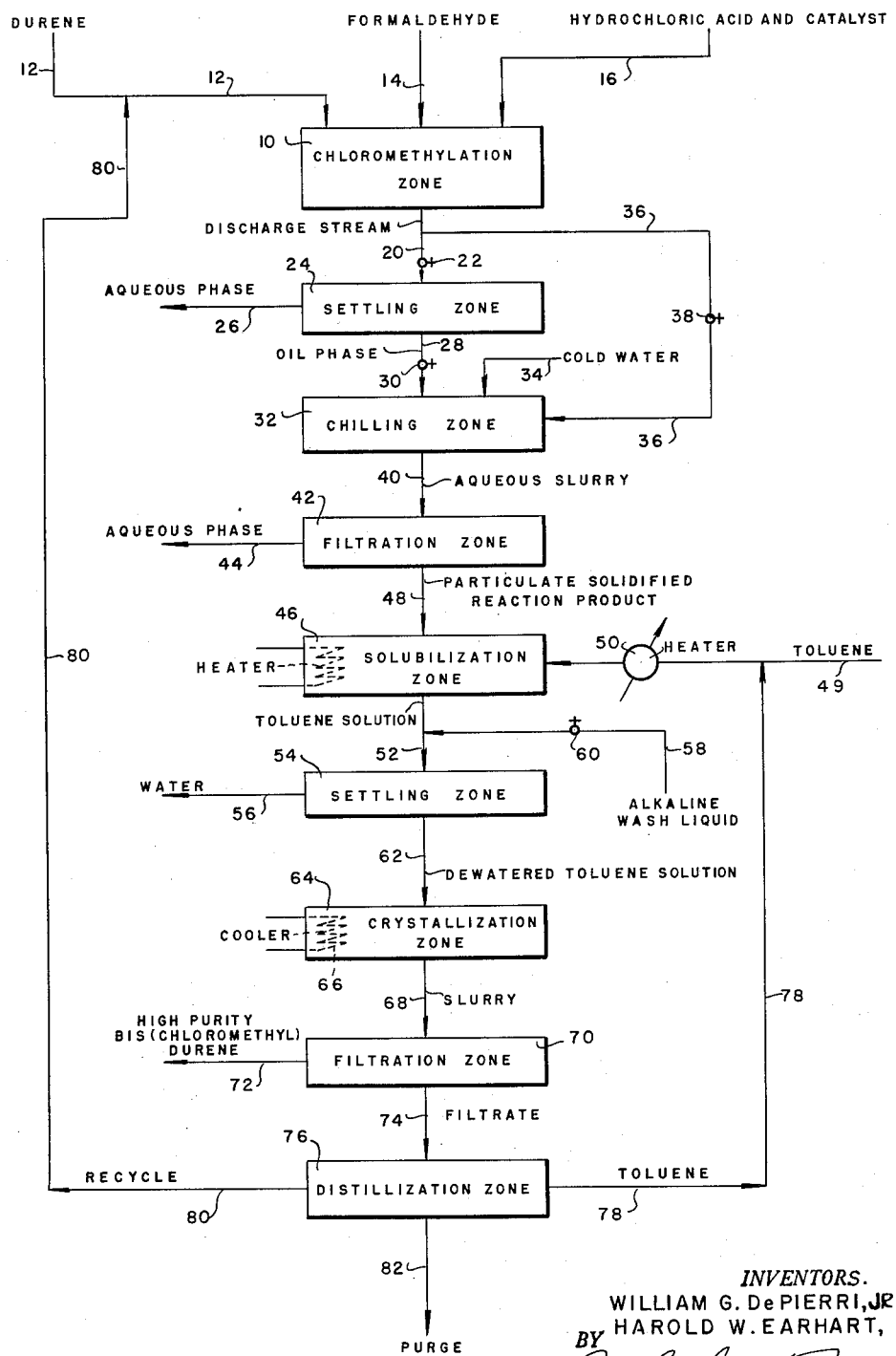

3,004,078
SELECTIVE PRECIPITATION OF BIS(CHLOROMETHYL) DURENE FROM TOLUENE
William G. De Pierri, Jr., and Harold W. Earhart, Baytown, Tex., assignors, by mesne assignments, to Esso Research and Engineering Company, Elizabeth, N.J., a corporation of Delaware
Filed July 14, 1959, Ser. No. 827,088
4 Claims. (Cl. 260—651)

This invention relates to a process for the purification of bis(chloromethyl)durene. More particularly, this invention relates to a solvent crystallization process for the substantially selective recovery of high purity bis-(chloromethyl)durene.

Bis(chloromethyl)durene is a difunctional compound which may be prepared by the dichloromethylation of durene. When durene is subjected to dichloromethylation conditions, the chloromethylation reaction product comprises a mixture of compounds, including bis(chloromethyl)durene, from which the bis(chloromethyl)durene is recovered only with difficulty.

It has now been discovered that substantially selective recovery of the bis(chloromethyl)durene may be accomplished by dissolving the chloromethylation reaction product in hot toluene, by thereafter cooling the thus formed solution to selectively precipitate the bis(chloromethyl)-durene and by thereafter recovering the precipitated bis-(chloromethyl)durene.

When this is done, bis(chloromethyl)durene of high purity, 95 to 99 percent, is obtainable with comparative ease. Solvents closely related to toluene are not satisfactory for this purpose. For example, benzene, because of its low boiling point, high freezing point, and toxicity, presents serious problems when its utilization as a solvent is attempted. Xylenes, on the other hand, are reactive with bis(chloromethyl)durene whereby a high purity product is not selectively obtainable.

The invention will be further illustrated in connection with the accompanying drawing wherein the single figure is a schematic flow chart illustrating a preferred mode of the present invention.

Turning now to the drawing, durene, formaldehyde, hydrochloric acid and a suitable chloromethylation catalyst such as zinc chloride, stannic chloride, boron trichloride, antimony pentachloride, etc. are charged to a chloromethylation zone 10 by way of charge lines 12, 14 and 16.

Briefly, the durene may be reacted with from about 2 to 6 mols of formaldehyde per mol of durene and from about 1 to 2 mols of hydrochloric acid per mol of formaldehyde under chloromethylation conditions including a temperature within the range of about 10 to about 150° C. for a reaction time within the range of about 0.5 to 5 hours. The chloromethylation reaction is described in greater detail in De Pierri and Earhart application Serial No. 717,225 filed February 24, 1958, now abandoned, and entitled "Chloromethylation Process," and in copending De Pierri and Earhart application Serial No. 826,994 filed on an even date herewith and entitled "Method for Chloromethylating Aromatic Hydrocarbons."

The chloromethylation reaction product would normally be comprised of an aqueous phase and an oil phase. The oil phase will normally comprise unreacted durene, monochloromethyl durene and other by-products and the desired bis(chloromethyl)durene. The aqueous phase will normally comprise water, unreacted formaldehyde, hydrochloric acid and the chloromethylation catalyst.

In accordance with the above-illustrated embodiment of the present invention, a discharge stream of the chloromethylation product is discharged from the chloromethylation zone 10 by way of a discharge line 20, controlled by a valve 22 leading to a settling zone 24.

Within the settling zone 24, phase separation is permitted to occur in order to separate the aqueous phase from the oil phase. The aqueous phase is discharged from the settling zone 24 by way of a discharge line 26 for further processing, as desired. Thus, the aqueous phase may be charged to a recovery zone (not shown) of any suitable construction wherein catalyst, hydrochloric acid and formaldehyde may be recovered for recycle and wherein excess water (e.g. water reaction) may be removed from the system.

The oil phase is discharged from the settling zone 24 by way of a line 28 controlled by a valve 30 leading to a chilling zone 32 wherein the oil phase may be admixed with a cold diluent such as water charged by a line 34 and rapidly chilled with agitation in order to form a slurry of beaded chloromethylation product in the diluent. Such a process is described in greater detail in copending De Pierri and Earhart application Serial No. 827,087 filed of an even date herewith and entitled "Method for Recovering Solid Chloromethylation Products."

In the illustration, the valves 22 and 30 in the lines 20 and 28 may be closed, whereby the settling zone 24 will be by-passed and instead the total reaction product from the chloromethylation zone 10 may be charged to the chilling zone 32 by way of a branch line 36 controlled by a valve 38. In this case, the aqueous phase of the slurry formed in the chilling zone 32 will contain water soluble components of the chloromethylation reaction product stream including formaldehyde, hydrochloric acid and catalysts.

The aqueous slurry formed in the chilling zone 32 is discharged therefrom by way of a line 40 leading to a filtration zone 42 of any suitable construction wherein the beaded chloromethylation product is recovered from the slurry. The aqueous phase of the slurry is discharged from the filtration zone 42 by way of line 44 for further processing, as desired.

In accordance with the present invention, the particulate solidified beaded chloromethylation reaction product is discharged to a solubilization zone 46 by way of conduit 48 and is there dissolved by hot toluene introduced into the zone 46 by way of a toluene charge line 49 containing a heater 50. It is generally preferable to utilize refluxing toluene which will dissolve about 50 percent of its weight of product. However, this is not absolutely necessary, provided that an amount of toluene is utilized for the temperature involved, to substantially completely dissolve the chloromethylation product. Thus, for example, the solubilization zone may be maintained at a temperature within the range of about 80° to 110° C.

The toluene solution of chloromethylation product is discharged from the solubilization zone 46 by way of a line 52 leading to a settling zone 54 wherein any water which may have been occluded in the beaded chloromethylation product is separated for removal by way of discharge line 56. Thus, the provision of the settling zone 54 provides for substantially complete dewatering of the product.

In accordance with the modified form of the invention, the toluene solution is treated with an aqueous alkaline wash liquid introduced into the line 52 by way of a branch line 58 controlled by valve 60 in order to neutralize any residual hydrochloric acid which may be present (e.g., an aqueous solution of sodium hydroxide, potassium hydroxide, ammonium hydroxide, etc.). In this case, the alkaline wash liquid is removed from the settling zone 54 by way of the line 56.

The dewatered toluene solution is next withdrawn from the settling zone 54 by way of a line 62 leading to a crystallization zone 64 wherein the toluene solution is cooled at a temperature range of about −10° to 35° C. by way of a cooler 66 of any desired construction whereby bis(chloromethyl)durene is substantially selectively precipitated.

The slurry of bis(chloromethyl)durene is discharged from the crystallization zone 64 by way of a line 68 leading to a filtration zone 70 wherein the bis(chloromethyl) durene is separated from the mother liquor.

The high purity bis(chloromethyl)durene is recovered by way of a discharge line 72 and the filtrate is discharged by way of line 74 which preferably leads to a distillation zone 76. Within the distillation zone 76 the filtrate may be separated into a light high purity toluene fraction which is recycled by way of a recycle 78 to the toluene charge line 49, and a heavier recycle stream containing unreacted durene and monochloromethyl durene, and a minor amount of unreacted bis(chloromethyl) durene which is recycled by way of a recycle line 80 to the durene charge line 12. A purge stream 82 may be provided to prevent an undue buildup of reaction by-product such as diphenyl methanes in the system.

The invention will be further illustrated by the following specific examples which are given by way of illustration and not as limitations on the scope of this invention.

*Example I*

Durene was dichloromethylated to prepare bis(chloromethyl)durene.

The dichloromethylation of durene was carried out in the following manner: a 3-necked Morton stirring flask was fitted with a Trubore stirrer having a water jacketed bearing, an efficient reflux condenser and a thermometer. The following materials were charged to the flask:

Durene _____ 805 g. (6 moles).
Zinc chloride (anhydrous) _____ 818 g. (6 moles).
Formalin (37 percent) _____ 2260 ml. (30 moles).
Hydrochloric acid (37 percent) ___ 3320 ml. (40 moles).
Non-ionic detergent _____ 7 ml.

The mixture in the flask was agitated and was heated at the reflux temperature (90–105° C.) for approximately 10 hours. At the end of the 10 hour period, heating was discontinued and about 4 liters of water-ice mixture was added to the flask with vigorous agitation. This was done in order to insure that the solid product would be in the form of small beads. The solid product was collected on a large sintered glass funnel and was washed with approximately 6 liters of distilled water. The washed product was then dried in vacuo over sodium hydroxide for at least 24 hours.

The recrystallization was carried out in open-top porcelain blending vessel equipped with an air drive stirrer, a copper tubing steam coil and a tight fitting lid. Into this vessel was placed 10 gallons of toluene. The toluene was heated to 100° C. and the crude reaction product was added and dissolved. After solution was complete, a solution of 500 g. of sodium carbonate and 3 l. of water was added as a wash solution to remove any residual hydrochloric acid. Stirring was stopped and the aqueous phase withdrawn. The solution in the blending vessel was then allowed to cool to room temperature and the crystals which formed were separated by centrifuging. The white crystals (8.5 kg.) which were obtained were found to be bis(chloromethyl)durene of 97 percent purity.

Examination of the mother liquor from the second crystallization indicated that it contained a large amount of material still dissolved in the toluene. Analysis of the dissolved material showed it to be chloromethyl-durene of 92 percent purity, the principal impurity being bis(chloromethyl)durene.

*Example II*

Example I was repeated with one exception. Solvent xylenes were utilized for the crystallization step in place of toluene. In this case, the mother liquor contained about 8 percent of diphenyl methanes formed by reaction of the bis(chloromethyl)durene with the xylenes. There was no such reaction in Example I when toluene was used as the solvent.

What is claimed is:

1. A method for recovering high purity bis(chloromethyl)durene from a crude solid durene chloromethylation reaction product containing the same which comprises dissolving said chloromethylation product in toluene at a temperature in excess of about 60° C., cooling said thus prepared toluene solution to a temperature within the range of about −10° to 35° C. to selectively precipitate said bis(chloromethyl)durene and recovering said precipitated bis(chloromethyl)durene.

2. In a method wherein durene is reacted with formaldehyde and hydrochloric acid in the presence of a chloromethylation catalyst to provide a reaction mixture comprising an aqueous phase and a crude product phase containing bis(chloromethyl)durene, in which said aqueous phase is removed from said product phase to provide a dewatered product phase comprising solid durene chloromethylation products, the improvement which comprises heating said product phase at a temperature within the range of about 80° to about 110° C. in the presence of an amount of toluene sufficient to dissolve said product phase, cooling said thus prepared toluene solution to a temperature within the range of about −10° to 35° C. to selectively precipitate bis(chloromethyl)durene and recovering said precipitated bis(chloromethyl)durene.

3. A method as in claim 2 wherein the precipitated bis(chloromethyl)durene is recovered by filtration, wherein the filtrate from which filtration step is fractionated into a toluene fraction and a recycle fraction and wherein said recycle fraction is treated with additional quantities of formaldehyde and hydrochloric acid in the presence of a chloromethylation catalyst to provide an additional quantity of bis(chloromethyl)durene.

4. In a continuous process for the production of high purity bis(chloromethyl)durene by the continuous reaction of durene with formaldehyde and hydrochloric acid in a reaction zone together with a chloromethylation catalyst, whereby a reaction mixture is formed comprising an aqueous phase and a crude product phase, in which a stream of reaction mixture is continuously withdrawn from said reaction zone and continuously separated into an aqueous phase and a solid product phase, the improvement which comprises continuously dissolving said product phase in toluene at a temperature in excess of about 80° C. in a solubilizing zone, continuously washing said toluene solution with an alkaline aqueous wash liquid at a temperature above about 80° C., continuously separating said aqueous wash liquid from said toluene solution, continuously cooling said toluene solution to a temperature within the range of about −10° to 35° C. to selectively precipitate bis(chloromethyl)durene, whereby a slurry is formed containing crystallized bis(chloromethyl)durene, continuously filtering said slurry in a filtration zone to recover high purity bis(chloromethyl)-durene, continuously fractionating the filtrate from said filtration zone into a toluene fraction and a recycle fraction comprising durene and durene chloromethylation products, continuously recycling said toluene fraction to said solubilizing zone and continuously recycling said recycle fraction to said reaction zone.

References Cited in the file of this patent

UNITED STATES PATENTS 2,873,299   Mikeska _____ Feb. 10, 1959